(12) United States Patent
Heer

(10) Patent No.: US 7,139,649 B2
(45) Date of Patent: Nov. 21, 2006

(54) METHOD FOR ADAPTATION OF A LEVEL OF A VEHICLE WITH AN AIR SUSPENSION ELEMENT

(75) Inventor: Siegfried Heer, Wiesloch (DE)

(73) Assignee: Haldex Brake Products GmbH (DE)

( * ) Notice: Subject to any disclaimer, the term of this patent is extended or adjusted under 35 U.S.C. 154(b) by 0 days.

(21) Appl. No.: 11/256,715

(22) Filed: Oct. 24, 2005

(65) Prior Publication Data

US 2006/0089769 A1    Apr. 27, 2006

(30) Foreign Application Priority Data

Oct. 23, 2004    (DE) .................... 10 2004 051 740

(51) Int. Cl.
*B60G 17/018*    (2006.01)
*B60G 23/00*    (2006.01)
(52) U.S. Cl. .................. 701/37; 280/5.514; 280/6.157
(58) Field of Classification Search .................. 701/37, 701/38, 39, 36; 280/5.514, 6.157, 6.158, 280/6.519, 124.16; 180/271, 282; 267/64.16, 267/64.2
See application file for complete search history.

(56) References Cited

U.S. PATENT DOCUMENTS

| | | | |
|---|---|---|---|
| 4,695,074 A | * | 9/1987 | Kobayashi et al. ...... 280/6.157 |
| 5,048,867 A | * | 9/1991 | Gradert .................... 280/6.159 |
| 6,845,988 B1 | | 1/2005 | Romer et al. ............ 280/5.514 |
| 6,857,646 B1 | * | 2/2005 | Sorum et al. .......... 280/124.16 |
| 6,898,501 B1 | * | 5/2005 | Schubert ..................... 701/50 |
| 6,948,721 B1 | * | 9/2005 | Lee .......................... 280/5.514 |
| 6,988,577 B1 | * | 1/2006 | Knight-Newbury et al. 180/271 |
| 2003/0101791 A1 | | 6/2003 | Ritter ......................... 72/705 |

FOREIGN PATENT DOCUMENTS

| | | |
|---|---|---|
| DE | 43 33 823 | 4/1995 |
| DE | 196 40 149 | 4/1998 |
| DE | 101 60 972 | 1/2003 |
| EP | 1 375 207 | 1/2004 |

* cited by examiner

*Primary Examiner*—Richard M. Camby
(74) *Attorney, Agent, or Firm*—St. Onge Steward Johnston & Reens LLC

(57) ABSTRACT

The invention relates to an adaptation of a level of an air suspension element of a vehicle from a starting level to a desired level. Usually, such adaptation is done by opening a control valve connecting an air container with the air suspension element for an opening interval.

According to the invention, a control unit determines an estimate for a future point in time for a suitable closing time of the valve. The estimate is determined considering
  a desired future level,
  actual loading conditions of the vehicle and
  an actual pressure level of the air container.

23 Claims, 6 Drawing Sheets a)

b)

METHOD FOR ADAPTATION OF A LEVEL OF A VEHICLE WITH AN AIR SUSPENSION ELEMENT

CROSS REFERENCE TO RELATED APPLICATIONS

This application claims priority to co-pending German Patent Application No. 10 2004 051 740.1 entitled "Verfahren zur Veränderung eines Niveaus eines Nutzfahrzeuges mit Luftfederungsanlage", filed Oct. 23, 2004.

FIELD OF THE INVENTION

The present invention generally relates to a method for an adaptation of a level of a vehicle from an actual or starting level to a desired (future) level. In particular the invention relates to such method for an adaptation of a level of a heavy duty vehicle. An adaptation of a level of a vehicle in the sense of the present invention could relate to an adaptation of a level of a frame of the vehicle with respect to one wheel of the vehicle, with respect to one axle of the vehicle or with respect to several axles or the overall level of the vehicle, wherein the term level might relate to a vertical distance and/or an inclination angle.

BACKGROUND OF THE INVENTION

A closed system for an adaptation of a level of a vehicle is known from DE 101 60 972 C1 corresponding to U.S. 2003 0101791 A1 and U.S. Pat. No. 6,845,988 B2. In such system a quantity of air is moved due to a pressure difference or due to the activity of a pump from an air container to a bellow or in opposite direction in order to change the level of a vehicle. Prior to such change of the level of the vehicle the temperature of the environment of the vehicle is measured. The actual mass of the quantity of air inside the closed system is calculated from the air pressure in the different components of the air suspension system, an actual level of the vehicle and the measured temperature of the environment. Furthermore, a desired mass of the air and a desired pressure of the air inside the closed system are calculated from the level of the vehicle, the temperature of the environment and the maximum change of the level of the vehicle which is possible from the actual level of the vehicle. In case of the actual pressure being smaller than the desired pressure an augmentation of the actual mass of air in the system is necessary. However, in case of the actual pressure exceeding the desired pressure the actual mass of air is decreased. Such changes result in adapting the pressure and the mass of air inside the air suspension system also in case of changes of the temperature of the environment such that the pressure and the mass of air is always sufficient to cause the maximum change of the level of the vehicle. A change of the mass and the pressure of the air inside the system might be provided by a pneumatic exchange of the air suspension system which could be done by means of an increase of the mass of air by a pump or by draining air to the environment. In summary, such technique relies on the assumption that the pneumatic conditions of the air suspension system should be held constant or comparable also in case of changes of the temperature in order to achieve a constant behavior throughout a change of a level of a vehicle.

Another method is known from EP 1 375 207 A2. According to that method for a change of the balance of the load of different axles the level of at least one axle is changed. The method aims at providing a minimum load for a steered front axle. By means of a change of the level of a rear axle the load of the steered front axle might be influenced. The load of the front axle is measured throughout a change of the level of the rear axle. In the following it is observed if the measured load of the steered front axle drops below a predetermined minimum load. In case of such criterion not being fulfilled the change of the level of the rear axle is continued until the minimum load is reached. Such method relies on a control under feedback of an actual value of a load of an axle.

Also document DE 43 33 823 A1 relates to an adaptation of a heavy duty vehicle from an actual level to a desired level. In order to provide for a fast adaptation process control valves with large opening cross-sections are used leading to a decreased precision of the approximation of the desired level. On the other hand, it is mentioned that the air inside the air suspension system comprises elastic features so that any actuating of the related valves into a closed state do not immediately finish any changes of the level but require further adaptation steps. In order to avoid such problems DE 43 33 823 A1 summarizes known methods basing on a control of the air suspension system to reach an intermediate level located between the starting level and the desired level. If such intermediate level is reached the valves are opened and closed in several steps in an intermittent way in order to approach the precise desired level. According to an alternative embodiment a valve responsible for the change of the level is not closed at the moment that the desired level is reached. However, throughout the change of the level a hold-back time is calculated from a measured speed of the change of the level. Throughout the change of the level of the vehicle the actual level is measured and compared to the desired level decreased by the hold-back level. In case of the actual level exceeding the desired level decreased by the hold-back level the valve is actuated in a closed state under the assumption that following to closing the valve any subsequent changes of the level are covered by the hold-back level. In case of further measurements showing that such assumption is not valid, the hold-back level is adjusted for future adaptations of the level of the vehicle. In special cases, the difference between the starting level and the desired level could be below a critical value. This might result in the time interval for a change of the level of the vehicle being too short to measure the speed of the change of the level. Only in such cases the opening interval is determined from an a priori known relationship between the difference of the starting level and the desired level and response time of the used valve. According to DE 43 33 823 A1 different load conditions of the heavy duty vehicle might be considered by making the aforementioned critical value of the difference between the starting level and the desired level dependent on the loading condition of the heavy duty vehicle.

Furthermore, DE 196 40 149 A1 discloses a control of the actual value of the level of a vehicle throughout the changes of the level. By means of an adapted linear relationship the after-running after the step of closing the valve is stored in dependence on a measured velocity of the change of the level of the vehicle. The after-running level is closely related to the hold-back level according to DE 43 33 823 A1. In case of the actual level of the vehicle exceeding the desired level of the vehicle decreased by the after-running level the valve being responsible for the change of the level is actuated in a closed state.

SUMMARY OF THE INVENTION

The present invention relates to a system for change and adaptation of a level of a vehicle or a heavy duty vehicle with an air suspension system from an initial level or an actual level to a desired level.

Such change or adaptation might be triggered by a driver of the vehicle, e.g. by means of manual activation or by means of requesting a change of the level by a fixed or variable amount. According to an alternative embodiment the change of the level is triggered automatically by a control unit, e.g. subsequent to a change of the loading conditions of a heavy duty vehicle or triggered by a step of measuring an actual level which is outside a predetermined range.

According to the invention it is also possible to adapt the level of the heavy duty vehicle due to the change of the conditions of the road or due to changes of the dynamical loads of the air suspension system for the traveling vehicle. Furthermore, the method might be used for keeping a heavy duty vehicle at a constant level or in a range of levels wherein undesired changes of the level are retransformed to the desired constant level by means of the method according to the invention. Finally, the cause of a change of the level might also be an automatic or manual request for a change of the balance of the loads of different axles, e.g. a change of the balance of the load of different axles of a driven axle and an auxiliary axle or lifting axle or according to EP 1 375 207 A2.

According to the invention, a pneumatic state of at least one air suspension element which might be a bellow responsible for a level of the heavy duty vehicle is changed by means of connecting the air suspension element over a valve in an open state with an air reservoir comprising a second pressure level. The second pressure level differs from the pressure level of the air suspension element.

The air reservoir comprising the second pressure level might be any element being suitable for providing the possibility of a change of the pressure of the air suspension element, in particular a closed air container with compressed air or the environment so that air might be drained. In case of the air reservoir being a container with a second pressure level greater than the pressure level of the air suspension element, the actuation of the valve in an open state will cause an increase of the pressure in the air suspension element with time. Such increase of the pressure in the air suspension element leads to an increase of the actual level of the vehicle. In case of the air reservoir being built by means of a drain of air, the second pressure level is smaller than the pressure level of the air suspension element. Accordingly, in such case an actuation of a related valve into an open state leads to draining air to the environment resulting in a decrease of the pressure level of the air suspension element.

Some time interval after the valve has been actuated in an open state the valve has to be actuated in a closed state in order to stop the change of the pressure in the air suspension element and in order to stop in proximity to the desired level of the vehicle. Any actuations of the valve at a point in time differing from the aforementioned time interval lead to deviations of the final level of the vehicle from the desired level. In practice, it has been observed that the necessary time interval might differ also for the same changes of the level being requested.

According to the invention, a method similar to a "predictor" is used to determine an estimate for a future point in time for an actuation of the valve into a closed state: in a control unit, an estimate for the future point in time is determined, wherein the estimate indicates the future point in time being suitable to activate the valve into a closed state. In order to determine the estimate, different influencing factors will be considered leading to an increase of the precision for the estimate of the future point in time:

One influencing factor of the estimate for the future point in time and accordingly the necessary time interval for opening the valve is the desired level of the vehicle or the desired change of the level of the vehicle from the starting level to the desired level. This feature of the invention considers the fact that larger changes of the level require larger opening intervals of the valves so that an increased amount of air necessary for larger changes of the level might be moved to or from the air suspension element.

Furthermore, according to the invention, the loading condition of the vehicle is considered. The invention has realized that increased loading conditions require longer opening intervals in order to achieve an increase of the level of the vehicle. This is due to the fact that any movement of air into the air suspension element and the resulting lifting of the level of the air suspension element has to overcome the load and the weight of the vehicle related to the air suspension element. On the other hand, an increase of the load of the vehicle and the weight of the vehicle simplifies a drain of air of the air suspension element due to the fact that the drain is sustained by the load and the weight.

As a third influencing parameter according to the invention, a pressure value correlating with the second pressure level of the air reservoir is considered. In case of a reduction of the level by means of draining the air suspension element, such pressure value might correlate with the pressure of the environment which in a first approximation might be supposed to be constant. In case of an increase of the level, the pressure value correlates with the pressure in the air container. The pressure value influences the pressure difference resulting in the velocity of the streaming air, the mass flow of air and the velocity of an adaptation of the pneumatic conditions for open valve as well as the future point in time for activating the valve into the closed state. Such pressure might also be correlated with a volume of the chamber of the air reservoir. By means of the pressure and/or the volume, an "energy level" or a "potential for an adaptation of the pressures" might be determined, wherein the energy level or potential is directly correlated with the velocity of a change of the level.

The aforementioned influencing parameters might be directly measured and fed to a control unit. According to an alternative embodiment, the aforementioned influencing parameters might be approximated on the basis of auxiliary measurements. Concerning the desired value of a change of the level, a difference between the initial level and the desired level might be determined and fed to the control unit. However, it is also possible that both the starting level as well as the desired level are considered by the control unit. One value concerning the weight and load conditions might be determined by means of a deflection of the suspension system throughout a change of the load of the vehicle. Such value could also be determined by means of the accelerating behavior of the vehicle throughout braking or accelerating the vehicle or for driving a curve. A value correlating to the loading conditions of the vehicle might be determined by means of the pressure in the air suspension element. In case of requesting a lift of the level, the second pressure value might be determined inside the container or in one of the conduits between the air suspension element and the air reservoir. In such cases it could be useful to consider a suitable correction factor due to pneumatic losses in the related conduits and elements.

The use of the estimate of the future point in time being indicative of the suitable point in time for actuating the valve in a closing state provides enough time for necessary actions, e.g. an actuation of the valve early enough to consider involved response times of the actuation device of the valve.

Furthermore, the change of the level of the vehicle might be superimposed by an oscillating movement of the vehicle. An actuation of the valve into a closed state on the basis of a control under feedback of the actual level of the vehicle according to the cited prior art might lead to an error. Also in such case, the method according to the invention leads to an increased precision due to the fact that the "predictor method" might be independent on the aforementioned oscillations. The method according to the invention might also be implemented without a control or feedback control. However, also for the embodiments of the invention an additional control or feedback control might be possible.

The method according to the invention might also be used in cases where the changing velocity of the level is quite large, the desired change of the level is quite small, the load or weight of the vehicle is very small or very large and/or the pressure difference between the second pressure level and the pressure level of the air suspension element is quite large. In such cases, a control according to the cited prior art is impossible or only possible with a complicated control structure. This is due to the fact that such control should be highly dynamic but also robust with respect to dynamic effects caused by oscillations. According to the invention, the time for the actuation of the valve into the closed state is known a priori.

By means of the control unit, the relevant influencing parameters might be considered
  in the form of functional dependencies,
  in the form of a priori determined characteristic diagrams and/or
  by means of an adaptation throughout the use of the vehicle.

Additionally to the aforementioned influencing parameters, it is also possible to use additional parameters, operational parameters, environmental parameters and/or measurements in order to determine the estimate of the future point in time.

According to another embodiment of the invention, the estimate for the future point in time is determined at a first point in time. At a second, later point in time the method comprises a validation in order to check for the chosen assumptions for determining the future point in time being correct and for the parameters influencing the future point in time being considered in a correct and sufficient manner. Such validation is done by validating a criterion at the second point in time, wherein the criterion correlates with the progress of the change of the level of the vehicle. Under consideration of the result of such validation the previously determined estimate of the future point in time is adapted or corrected, if necessary. Such validation and adaptation, if necessary, might be done only once or several times leading to an increase of the precision of the result of the method according to the invention and leading to an increase of the precision of the final level of the vehicle. Furthermore, it is possible to check if the assumptions and considerations of the control units concerning the influencing parameters in order to determine the estimate have been valid or not. If necessary, the assumptions and the underlying algorithm to determine the estimate might be adapted for future determinations of the estimate. Such features might also be helpful to consider changes of the air suspension system throughout the use of the vehicle or also in case of damages of single components of the air suspension system, e.g. leakages inside the air suspension system.

According to the present invention, the first point in time might also be chosen prior to an actuation of the valve into the open state. In such case, right before starting the adaptation process, the time interval for the adaptation process might be guessed. Furthermore, knowing the necessary time interval, a suitable later point in time might be chosen. The choice of the first point in time prior to an actuation of the valve into the open state might be desirable in cases of very fast and/or short changes of the level of the vehicle.

The method may also include to check if an actual level of the vehicle reached some predetermined time after performing said step of activating the valve into an open state is within a given tolerance from an auxiliary level that should be approached prior to the estimated future point in time. If such check leads to a positive result, an adaptation of the estimate of the future point in time is not possible—otherwise an adaptation is necessary.

According to one suggestion of the invention, the adaptation of the future point in time might be done considering the deviation of the changed actual level from the auxiliary level wherein the deviation indicates the necessary amount of an adaptation. According to another alternative or cumulative feature, another validation process takes place after the actuation of the valve into the closed state at the future point in time. This validation is done by comparing the actual level of the vehicle after the future point in time with the desired level. Such comparison might be performed immediately at the future point in time or after a predetermined waiting time so that any occurring oscillations might decay. In case that the future point in time has been estimated with a fault, such validation leads to an undesired deviation of the actual level from the desired level. In such case, the valve again is actuated in the open state. Similar to the above described features, a new opening time interval for the second opening state of the valve might be estimated. However, any known type of controlling the level of the vehicle and/or for controlling the valve might also be used for such second adaptation process. It should be mentioned that it is possible that according to the invention during the first adaptation process the level of the vehicle and the pressure of the air suspension element is increased by connecting the air suspension element with the air container, wherein the second adaptation process might include a drain of air. In other cases, it might be possible that in the first adaptation process the air suspension element is drained, whereas in the following adaptation process the air suspension element is connected with an air container with a higher pressure level.

Besides the above mentioned influencing parameters, also other parameters might be considered. One relevant influencing parameter might be the air consumption of an additional consumer being connected to the air reservoir. Such additional consumer might be an additional air suspension circuit, a braking circuit, an air trailer circuit or a circuit for another consumer.

On the other hand, the control unit might consider a process of engagement or disengagement of a clutch or a brake, a shift of a transmission system, a deactivation of a parking brake or the actuation of a vehicle brake, wherein the aforementioned processes lead to a change of the pneumatic conditions of the air circuit including the air suspension element and the air reservoir.

Furthermore, the method according to the invention might consider as another influencing parameter the operational state of a compressor, wherein the compressor interacts with the air reservoir. In such cases, any changes of the pressure level of the air reservoir might be considered.

According to a further embodiment of the method according to the invention, the present state of an axle of the vehicle, in particular a characteristic of the air suspension element or bellow, the characteristic and the operational state of a suspension strut, a stabilizer, balancer or anti-roll bar or a staggering control unit might be considered. In case of the air suspension element comprising a non-linear behavior with respect to the filling of the air suspension element with air such non-linear behavior might be considered by means of a characteristic diagram or a functional dependency being stored or implemented in the control unit.

According to another embodiment of the invention, the control unit actuates the valve prior to approaching the estimated future point in time in order to introduce the process of transforming the valve into the closed state. The time for actuating the valve into the closed state is shifted by the time correlating with the response time of the valve and the associated actuating units. Such response time(s) might be predetermined and might be known a priori and might be implemented in the control unit.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 2a shows a time signals of the second pressure level of an air reservoir, a pressure of the air suspension element or bellow and the level during the change of the level of the vehicle with a small second pressure level.

FIG. 2b shows a time signal of the state of a valve during the change of the level according to FIG. 2a.

FIG. 3a shows a time signals of the second pressure level, the pressure level of the air suspension element or bellow and the level during the change of the level with a second pressure level which is larger than that of FIG. 2a.

FIG. 3b shows a time signal of the state of a valve during the change of the level according to FIG. 3a.

FIG. 4a shows a time signals of a second pressure level, a pressure level of the air suspension element or bellow and the level during a change of the level with an adaptation of the estimated future point in time.

FIG. 4b shows a time signal of the state of a valve during the change of the level according to FIG. 4a.

DETAILED DESCRIPTION OF THE DRAWINGS

Figure 1:
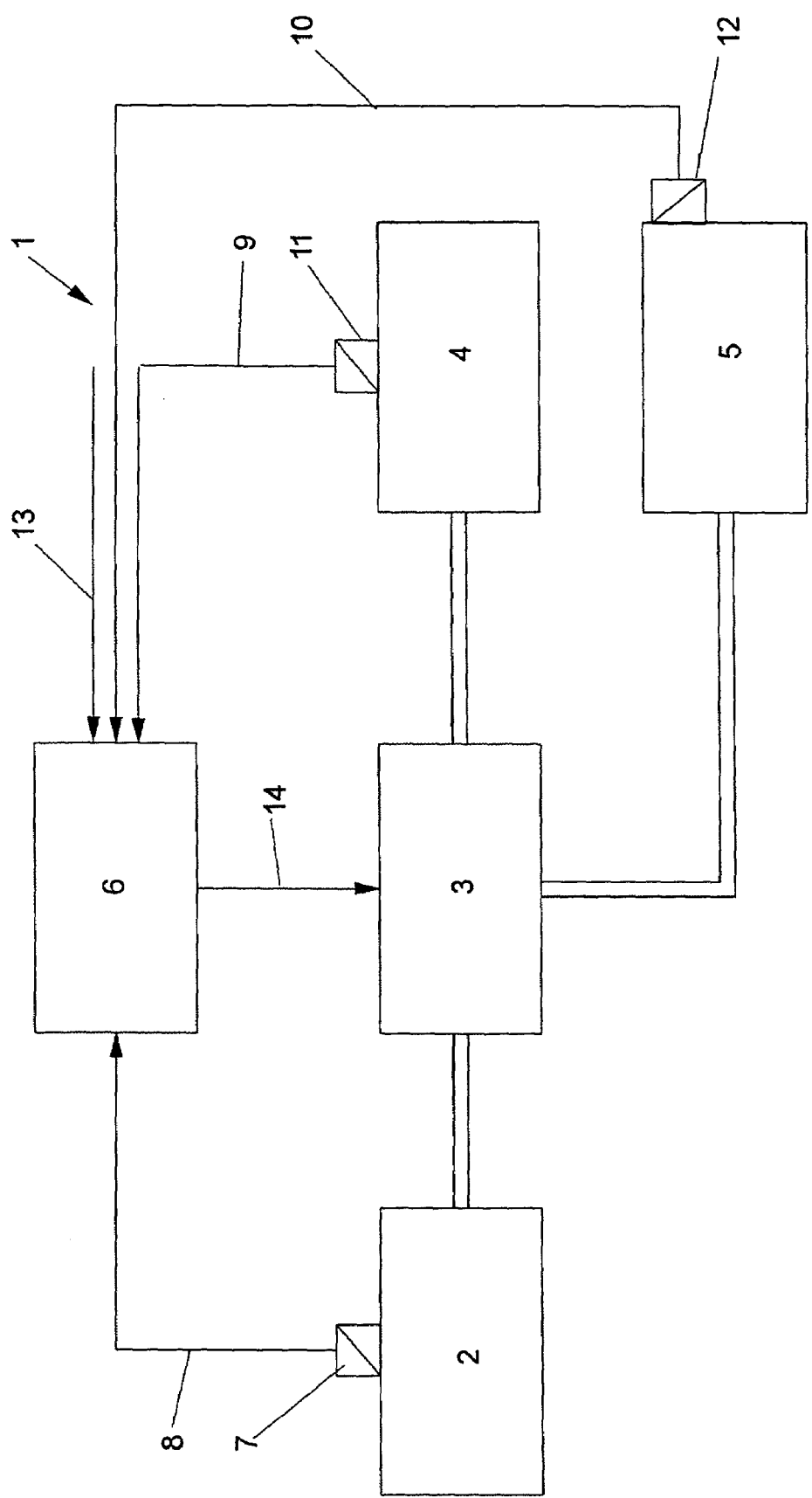
FIG. 1 shows a schematically diagram of an air suspension system.

Referring now in greater detail to the drawings, FIG. 1 shows an air suspension system 1 comprising at least one air suspension element, here a bellow 2, which is interposed between a wheel or an axle of a heavy duty vehicle and a vehicle frame. The bellow 2 and a second pressure level are connected by a valve 3 in order to provide a possibility to change the pressure level inside the bellow 2. The second pressure level differs from the pressure level of the bellow 2. The second pressure level might be provided from an air reservoir or container 4 which is supplied by air under pressure by a compressor (not shown). In case of a connection of the bellow 2 with the air container 4 the second pressure level is larger than the pressure level of the bellow 2. The second pressure level might also be smaller than the pressure level of the bellow 2. In such case, the second pressure level is provided by a drain unit 5 which in the simplest case is a drain to the environment. By means of valve 3 bellow 2 might be connected to the air reservoir 4 and/or the drain unit 5. The valve 3 is a switched valve that is actuated in a suitable way, e.g. with an electrical or pneumatic actuator controlled by a control unit 6. The valve 3 might be a valve in any design or a complex unit comprising several valves or pneumatic elements providing a pneumatic link of the bellow 2 with the air reservoir 4 and/or the drain unit 5. The bellow 2 might schematically illustrate one single bellow of the vehicle or several bellows arranged in series or parallel at one suspension point, several bellows related to an axle or several bellows related to several axles.

The control unit considers a pressure value determined by means of pressure sensor 7. The pressure value measured by pressure sensor 7 correlates with the pressure in bellow 2 and is fed into the control unit 6 by means of signal wire 8. By means of signal wires 9 and/or 10 the control unit is also fed with a pressure value measured by pressure sensors 11, 12 and correlating with the second pressure level. In a similar manner, a displacement signal of a displacement sensor could be fed into the control unit 6. Furthermore, by means of a signal wire 13, additional parameters could be transferred to the control unit, e.g. measurement signals, operational parameters, environmental parameters and control signals and requests of a user of the vehicle. Further parameters might be the temperature of the environment or a temperature of one of the related pneumatic components, a characteristic feature with respect to the dynamic driving state, a pneumatic operational characteristic feature of at least one of the pneumatic elements, an operational characteristic feature with respect to a braking circuit, a trailer circuit or an additional consumer circuit, a characteristic parameter or the rotational speed of a compressor, operational parameters with respect to the states of valves, operational parameters with respect to the engagement or disengagement of a clutch, a measured deflection of one tire, manual signals from the user, operational characteristic features of a damper or a control system with respect to slippage, a staggering control unit, a stabilizer, a parameter or measurement value with respect to the driving state of the heavy duty vehicle, a parameter describing the conditions of the road and others.

By means of the control wire 14 the control unit 6 controls the switching valve 3 in a suitable way under consideration of the signals transferred by the signal wires 8, 9, 10, 13. The control unit 6 comprises a processor including suitable control algorithms. Furthermore, the control unit might include functional one-dimensional dependencies or more-dimensional dependencies of the aforementioned parameters and the process of changing the pressure conditions of the bellow 2. These relationships could be implemented in the form of mathematical functions and/or in the form of characteristic diagrams. The mathematical functions and/or the characteristic diagrams might be given a priori prior to the first operation of the vehicle and could be implemented in the control unit and a suitable storing device of the control unit 6. Additionally or alternatively, the functions and/or characteristic diagrams could be learnt or adapted throughout the operation of the vehicle. By means of another electrical connection which is not shown in the figures, the control unit 6 might cooperate with other control units, e.g. by means of a CAN-bus-system.

Figure 2:
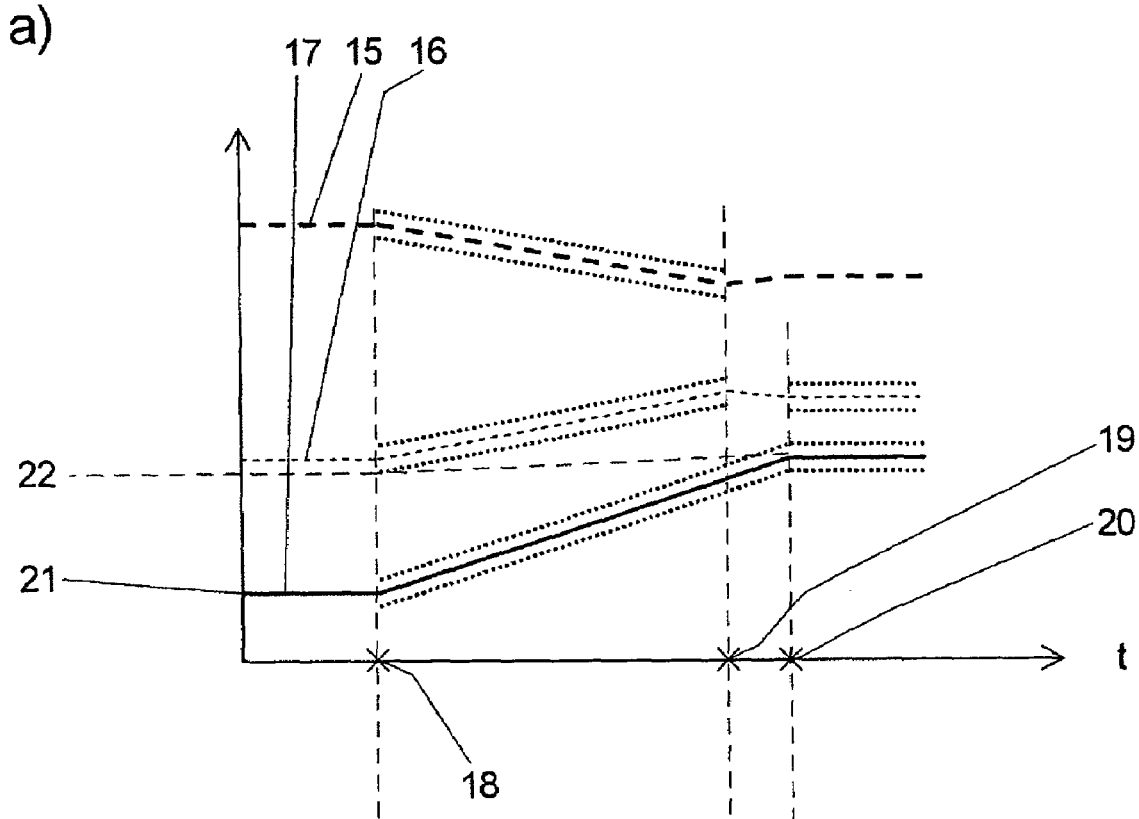
Figure 2:

FIG. 2a shows a signal 15 of the pressure level of the air container 4 over time during an increase of the level due to the actuation of the valve 3 in an open state. Signal 16 shows the pressure level of the bellow 2 over time, whereas signal 17 shows the changing level over time. FIG. 2b shows the different states of valve 3 during a change of the level according to FIG. 2a, wherein state "0" indicates the valve 3 being in a closed state with respect to the connection of air container 4 and/or drain unit 5 with bellow 2. Instead state "1" indicates a pneumatic connection between bellow 2 and the air reservoir 4 with the valve 3 in an open state. At a point in time 18 valve 3 is switched from state 0 to state 1. Due to the pneumatic connection between bellow 2 and air reservoir 4 following to the point in time 18 the pressure in the air container 4 drops down resulting in a decreasing signal 15, in particular decreasing with constant slope. Signal 17 of the actual level increases in that time interval, in particular also linear. Due to the amount of air moved towards the bellow 2 the pressure inside bellow 2 increases resulting in an increasing signal 16. Prior to and/or after the point in time 18 a future point in time 19 is determined. The future point in time 19 serves as an estimate for the point in time when valve 3 is transferred from the open state "1" into the closed state "0" by means of the control of the control unit 6. Until the point in time 20 after the future point in time 19 FIG. 2 shows a decay phase. The decay phase correlates with a dead time or response time of the actuation of valve 3, with pneumatic oscillations in the pneumatic elements and/or with further oscillations of the heavy duty vehicle. At the point in time 20 the heavy duty vehicle is completely transferred from the actual level 21 or starting level prior to the point in time 18 to the desired level 22.

Figure 3:
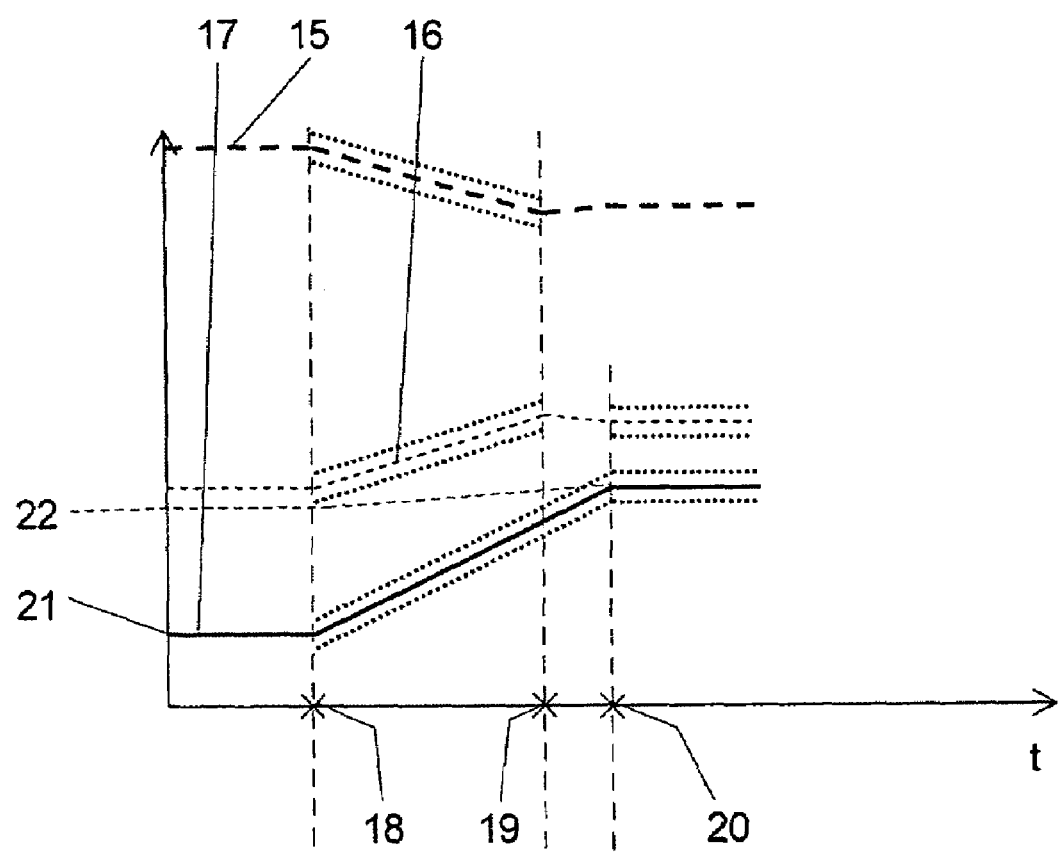

FIG. 3a shows different time signals related to processes of adaptations of the level of the vehicle wherein the difference between the pressure level of bellow 2 and the second pressure level, in particular the pressure level of the air reservoir, is larger and/or the load acting upon the vehicle, the axle or the suspension element is smaller. These parameters result in the future point in time 19 being located closer to the point in time 18 so that the opening interval of valve 3 has to be shorter. Furthermore, FIG. 3a shows that the signals 15, 16 and 17 are steeper for the valve 3 being in the open state. This means that for those parameters it is of great value to know the future point in time 19 quite early. On the other hand, as a result of the steeper signals, an error for determining or estimating the future point in time 19 has a greater impact on the deviation of the final level of the vehicle from the desired level. This means that a precise consideration of the influencing factors on the change of the level of the vehicle is of increased importance for those parameters.

Figure 4:
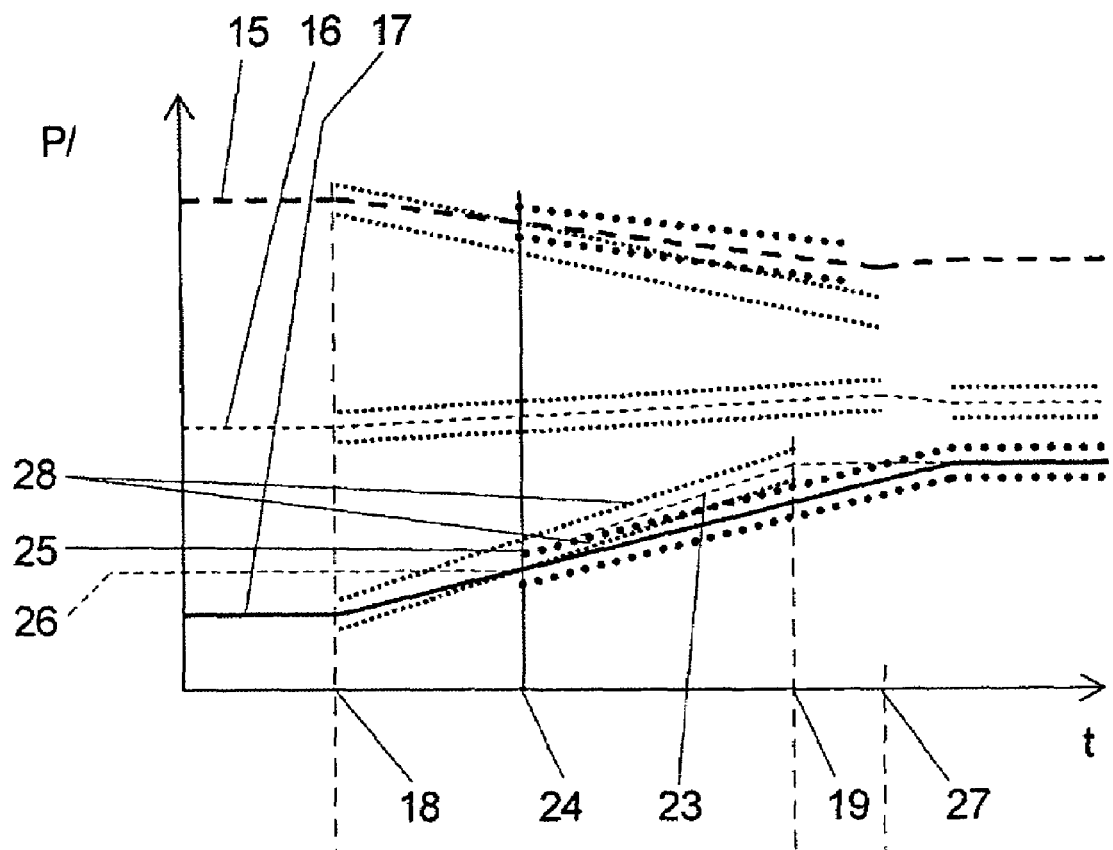

The time signals 15, 16, 17 shown in FIGS. 4a and b are related to determining a future point in time 19 by means of the control unit prior or (slightly) after the point in time 18. Signal 23 indicates a future signal of the level guessed by the control unit. At a point in time 24 located between the points in time 18 and 19 a step of validation is performed checking whether the implementation of the influencing parameters in the control unit correlates with the actual conditions. At the point in time 24 for such validation the control unit 6 predicts an auxiliary value 25 of signal 23 which is compared to the actual value 26 of signal 17 at the point in time 24. Depending on the result of such comparison the estimated signal 23 is adapted leading also to an adaptation of the estimated future point in time 19 to an adapted future point in time 27. The change of the slope of the estimated signal 17 might correlate with the result of the comparison of the values 25, 26. The extent of a shift of the future point in time 19 to the future point in time 27 could also correlate with the result of the aforementioned comparison. It is also possible that the control unit considers a tolerance window 28 on both sides of the estimated signal 23. In case of the actual signal 17 of the level moving outside the tolerance windows 28 the adaptation process of the estimated signal 23 is performed. Similar evaluations, adaptations and tolerance windows might also be determined and analyzed in the control unit 6 for signal 15 and signal 16 (see FIG. 4).

Figure 5:
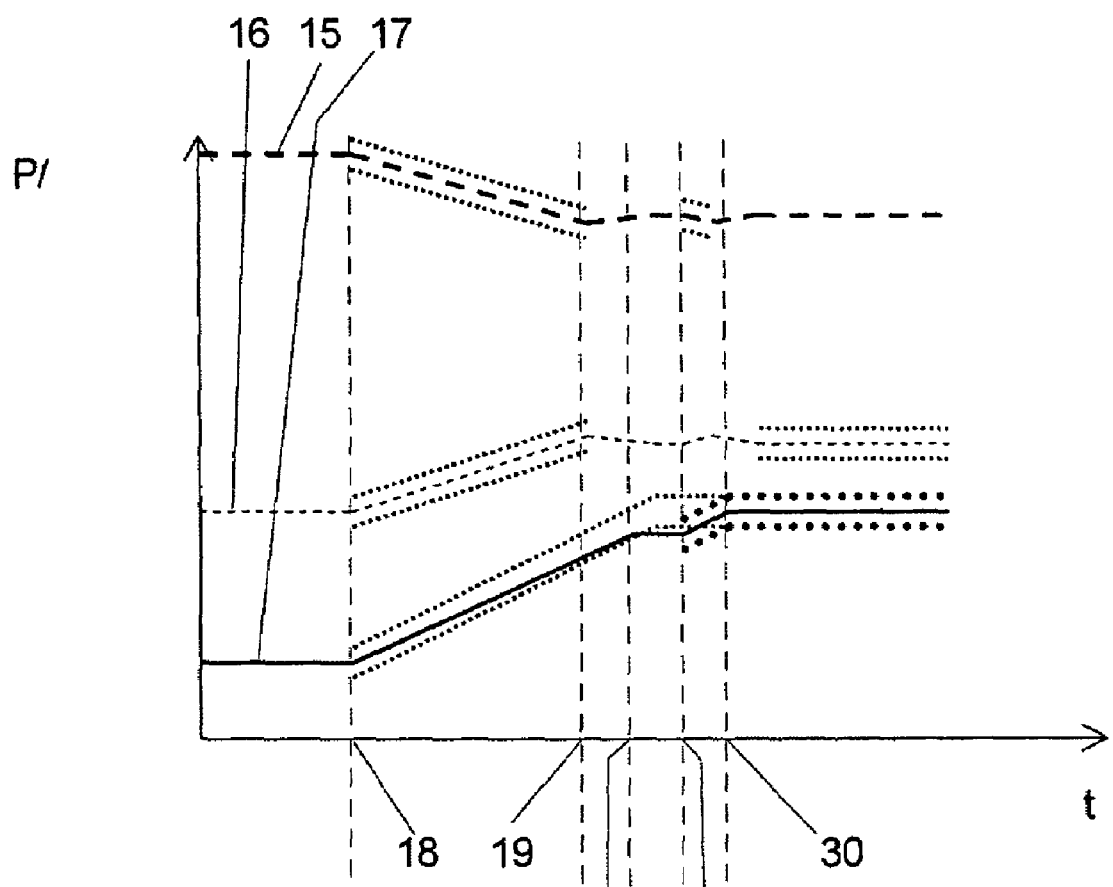
FIG. 5a shows the time signals of the second pressure level, the pressure level of the air suspension element or bellow and the level during the change of the level with the actuation of the valve in a closed state at the estimated future point in time and a subsequent additional control.
Figure 5:
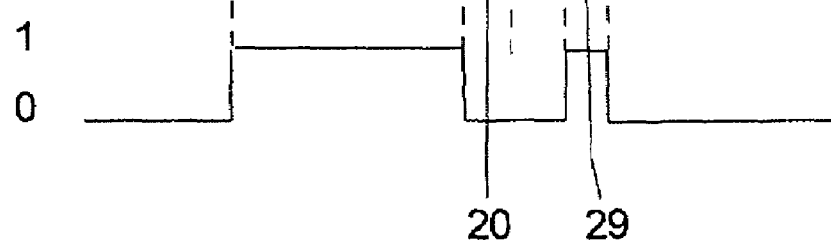

According to the alternative embodiment shown in FIG. 5 an adaptation process during the time interval between the points in time 18 and 19 might not be necessary. In such case, after the point in time 19 and after the transfer of valve 3 in the closed state it is checked whether the signal 17 has really reached the desired level. A variety of criteria could be checked, e.g. a comparison of the absolute values of the actual level and the desired level or a comparison of the difference of the aforementioned levels with a tolerance window or a threshold. In case the desired level is not reached with a sufficient precision at a point in time 29, which is similar to the point in time 18, valve 3 is again actuated in the open state. Thus a "second adaptation process" takes place. The following procedure is similar to that of the first adaptation process starting at the point in time 18, wherein the desired change of the level might be much smaller in the second adaptation process. A second estimate for a future point in time 30 is determined and at the future point in time 30 valve 3 is again actuated in the closed state. However, differing from the embodiment of the method shown in FIG. 5 following to the future point in time 19 any known method for a control of the change of the level might be used.

Figure 6:
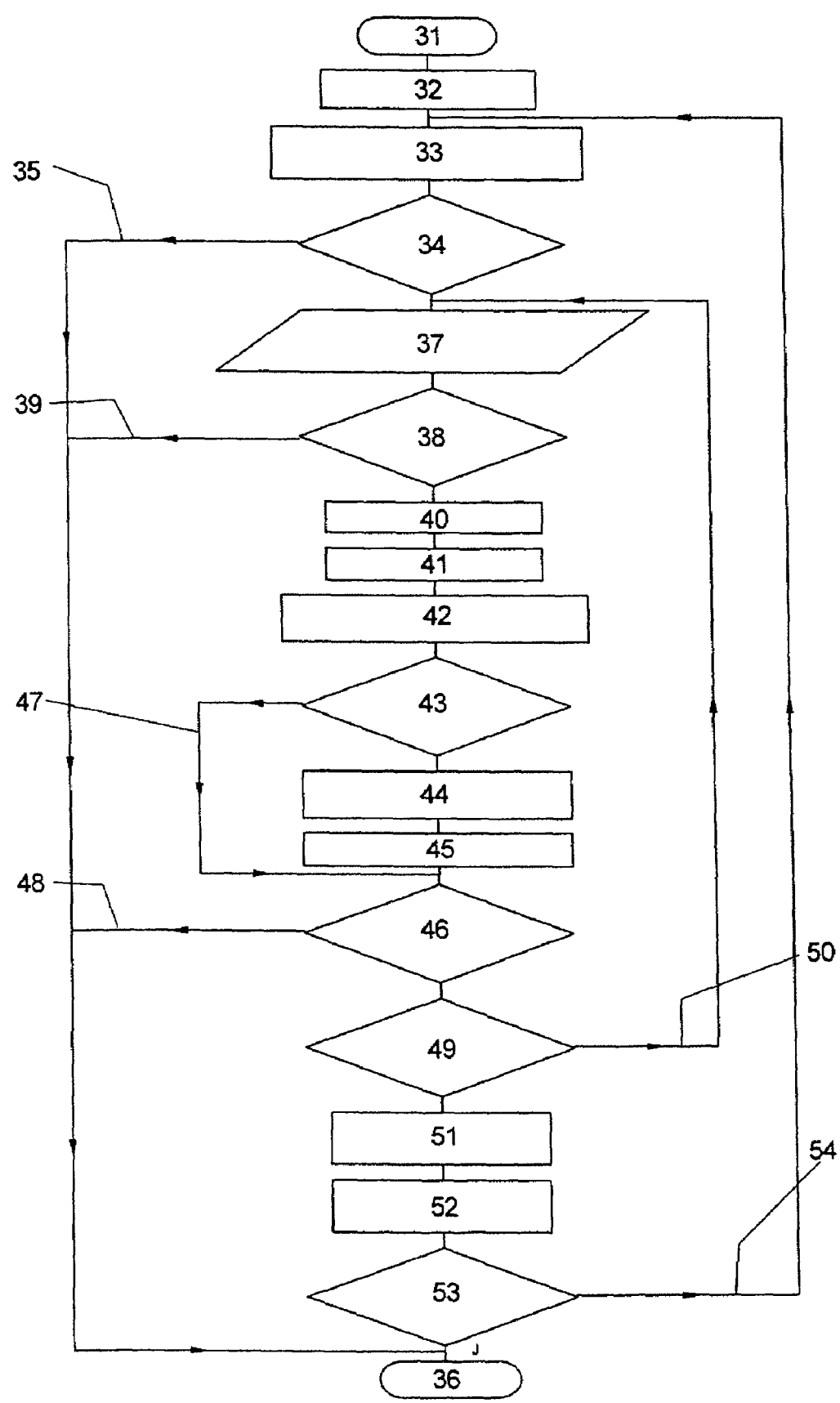
FIG. 6 shows a flow chart for one embodiment of the method according to the present invention.

FIG. 6 schematically shows a flow chart being implemented in the control unit 6. Block 31 indicates the start of the method. Such start could be triggered automatically, manually or with the ignition of the engine of the vehicle.

After the start according to block 31 in a subsequent step indicated by block 32 the actual values are measured and fed into the control unit. Those values could be the measurement signals of the pressure sensor 7 being transferred by signal wires 8, 9, 10, 13.

Then in block 33 requests from a user interface, e.g. a manual user interface used by the driver or a user interface of other control units, will be transferred to the control unit.

In a subsequent step indicated by decision block 34, the control unit 6 determines if a change of the level is necessary under consideration of the actual values received according to block 32 as well as the request received according to block 33. In case of a change of the level being necessary, the control unit 6 also determines the desired quantity of the change of the level.

In case of no need for a change or an adaptation, the algorithm branches over the exit branch 35 to the end block 36.

However, if a change of the level seems to be necessary, the control unit 6 determines a prediction of at least one future time signal, e.g. signal 15 of the pressure of the air reservoir, signal 16 of the pressure of bellow 2 and/or a signal 17 of the level.

In a step correlating with block 37, a plausibility—check is done checking if the estimated signals 15 to 17 are lying within an acceptable range. In case of a pressure difference not being sufficient it might not be possible to cause the desired change of the level of the heavy duty vehicle. In such case, the procedure could be exited by means of exit branch 39. An error code could be produced and/or the air suspension system could be controlled such that a pressure level, e.g. the pressure of the air container, see DE 101 60 972 C1, is changed. Furthermore in block 37 an estimate for the future point in time 19 might be determined.

In case of the examination in block 38 leading to the result that the signals 15 to 17 are within a given range, in a step indicated by block 40 valve 3 will be actuated in the open state. Such actuation is done at the point in time 18.

At a point in time 24 according to FIG. 4 in a step indicated by block 41 an actual value 26 of signal 17 is measured which will then be compared in block 42 with the predetermined signals, in particular with the auxiliary value 25.

In a subsequent decision block 43 it is checked if the comparison according to block 42 leads to a difference between the values 25, 26 exceeding a given threshold. If this is the case an adaptation of the estimated signals will be done by the control unit 6. Furthermore, the estimated future point in time might be adapted from the point in time 19 to a new estimate of the future point in time 27.

Whereas in block 44 the signals will be adapted, e.g. by means of new characteristic parameters of the curvature of the signals, in block 45 the estimated signals themselves will be determined and adapted.

In the decision block 46 it will be checked whether the signals lie within given ranges or not. If decision block 43 results in differences not being tolerable, decision block 43 immediately branches to decision block 46 by means of bypass 47. In case of the check in decision block 46 yielding the result that the signals are not within given parameters or ranges, the method branches to the end block 36 by means of the exit branch 48.

In case of the signals lying within given parameters or ranges, decision block 49 checks whether the estimated future point in time 19 or 27 is reached. If this is not the case, the method returns back to block 37 so that the signals might be calculated another time.

Instead, in case of the future points in time 19, 27 being reached, valve 3 is actuated in block 51 into its closed state.

In the following in block 52 the procedure waits for a decay time.

In decision block 53 another check will be performed if the level at the end of the decay time corresponds to the desired level. If this is not the case, the procedure might branch back by means of branch 54 to block 33 so that according to FIG. 5 the procedure starts again—now with a decreased desired change of the desired quantity of the change of the level. In the other case, the end 36 of the procedure is reached.

In the control unit 6, a variety of influencing factors on the signals 15 to 17 might be considered:

a) Influencing Factors of the Air Reservoir 4 and the Air Consumption

The control unit might consider a given volume of the air container which could be used as an indicator concerning the velocity of a drop of the pressure inside the air reservoir. Furthermore a volume of the conduits of the overall air suspension system 1 or parts of the air suspension system might be considered. Additionally or alternatively, the conduits of a braking circuit, a trailer circuit or an auxiliary consumer circuit might be considered in case of these units also being connected to the air container 4. It is also possible that a pressure level of an air suspension circuit, a braking circuit, a trailer consumer circuit or an auxiliary consumer circuit is considered. The supply activity of a compressor towards the air container might also be taken into account wherein both the operational state of the compressor as well as the rotational speed of the compressor and the delivery of air towards the air container are of significance. Further important parameters are the delivery from or to other circuits of compressed air (brake, trailer consumer circuit, auxiliary consumer circuit) wherein also losses in the area of the valve or other pneumatic components should be considered. Also the temperature of the environment, the temperature of the bellows 2 and/or the air in the air suspension system 1 might be considered, see also DE 101 60 972 C1. Furthermore, the behavior might be dependent on the air consumption of the connected valves or consumers, in particular a change of the state of a valve, e.g. during engaging or disengaging a clutch, during a shift of the transmission system, during deactivating a parking brake, during braking and the like.

b) Influencing Factors of the Air Suspension Element or Bellow

With respect to bellow 2 characteristic features of the bellow might be considered and might be implemented in control unit 6 in order to predict the signals and the estimate of the future point in time. These characteristics might be dependent on the effective diameter of the bellow 2 which might comprise a non-linear dependency on the pressure in bellow 2. Furthermore, a linear or non-linear dependency on the vertical deflection of the bellow 2 might be given. An error might result from deflections of the tires due to a change of the load of the vehicle. Those deflections lead to a change of the level that will not be measured by the displacement sensors located between the vehicle frame and the axle or the wheel. In such cases, it is reasonable to consider such deflections of a tire in the control unit 6 which might be implemented by means of a mathematical function or a characteristic diagram in dependence on the detected load condition in control unit 6.

c) Influencing Factors of the Axle Module

Important parameters might be the activity and the mechanical properties of a damper, a strut member, a struggling control, a stabilizer or the temperature of the axle module.

d) Influencing Factors of the Conduit and the Valves, in Particular the Pneumatic Elements of Valve 3

One important parameter being implemented in control unit 6 might be the response time of valve 3, other pneumatic elements or electric actuators. Furthermore, the behavior might be influenced by the effective length of the tubing system and the characteristic properties of the tubing and conduits, e.g. throttling effects. Also the temperature might influence signals 15 to 17.

e) Influencing Parameters of the Driving State of the Vehicle

An increase of the precision of the method according to the invention might be achieved by considering parameters describing the movement of the vehicle, e.g. changes of the driving velocity of the vehicle that might lead to a nodding movement of the vehicle or a struggling movement in a curve. Another influencing parameter might be the condition of the road due to the fact that vertical deflections of the road might dynamically impinge the air contained in the air suspension system and the bellows 2. Further influencing parameters might be the state of a brake, a parking brake, any pneumatic brake being in collaboration with the air suspension 1.

According to another embodiment of the invention, for any change of the level of the vehicle initially the starting level or actual level of the vehicle is determined, see block 32. This might be done by measuring the pressure in the air container 4 or in one of the associated conduits, wherein any losses might be considered. Furthermore, it might be advantageous to determine the starting level of the vehicle measured between a frame and an axle. In case of operational parameters of a staggering control or the stiffness of a damper or a strut member, these parameters should also be considered. Furthermore, in some cases an activated brake results in some pretension of the axle module resulting in a changed level of the pressure in the bellows. Furthermore consideration of the load distribution as well as the distance of the center of gravity of the loads or the distribution of the load to the different axles of a heavy duty vehicle might be helpful.

As described before, according to the invention a desired level might be fixed for varying parameters which could be done e.g. on the basis of the described steps indicated by blocks 33 and 34. It is helpful to consider any changes of the load conditions and changes of the distance of the center of gravity, e.g. a change of the distribution of the load to single axles of the heavy duty vehicle. One example might be a tanking or petrol vehicle, wherein any movements of a fluid located inside the tanking vehicle due to accelerations, decelerations or a changed slope of the tank might be considered.

In order to estimate the signals 15 to 17, it might be helpful to calculate the movement of air in one, all or each air suspension circuit. It is also possible to calculate the lifting signal over time. Additionally, it might be useful to calculate the signal of the pressure in the air container 4 of the air suspension system 1 under consideration of the characteristics of the conduits and tubing and valves and under consideration of the driving mode of the vehicle. Instead of measuring the level by means of a displacement sensor, also an angular sensor might be used.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A method for an adaptation of a level of a vehicle from a starting level to a desired level, the vehicle including an air suspension element, a control unit, an air reservoir, a valve being controlled by the control unit, the valve being interposed between the air reservoir and the air suspension element, said method comprising the steps of actuating the valve into an open state and thereby connecting the air suspension element having a first pressure level via the valve being actuated into the open state with the air reservoir having a second pressure level, wherein the second pressure level differs from the first pressure level, so that the first pressure level of the air suspension element is changed;

determining an estimate for a future point in time from values at least correlating with the desired level of the air suspension element, the actual loading conditions of the vehicle and the actual second pressure value; and using the estimate for a prediction for the point in time for an actuation of the valve into a closed state.

2. The method of claim 1, wherein said step of determining an estimate for a future point in time is performed at a first point in time;

the control unit at a second point in time later than the first point in time validating a criterion, the criterion being indicative of a progress of an actual change of the level of the vehicle and the control unit adapting the previously determined estimate under consideration of the result of said step of validating.

3. The method of claim 2, the first point in time being chosen prior to performing the step of actuating the valve into an open state and the second point in time being chosen later than the point in time of performing said step of actuating the valve into an open state.

4. The method of claim 2, wherein prior to approaching the estimate for a future point in time an auxiliary level is determined and said step of validating a criterion includes checking whether an actual level of the vehicle reached some predetermined time after performing said step of activating the valve into an open state is within a given tolerance from the auxiliary level.

5. The method of claim 3, wherein prior to approaching the estimate for a future point in time an auxiliary level is determined and said step of validating a criterion includes checking whether an actual level of the vehicle reached some predetermined time after performing said step of activating the valve into an open state is within a given tolerance from the auxiliary level.

6. The method of claim 1, further comprising the steps of actuating the valve at the estimate of the future point in time into a closed state, comparing the actual level of the vehicle and the desired level of the vehicle; and actuating the valve again into an open state if the deviation of the actual level of the vehicle from the desired level of the vehicle exceeds a given threshold.

7. The method of claim 1, wherein said step of determining the estimate for a future point in time comprises considering at least one air consumption of an additional consumer being connected to the air reservoir.

8. The method of claim 2, wherein said step of determining the estimate for a future point in time comprises considering at least one air consumption of an additional consumer being connected to the air reservoir.

9. The method of claim 3, wherein said step of determining the estimate for a future point in time comprises considering at least one air consumption of an additional consumer being connected to the air reservoir.

10. The method of claim 4, wherein said step of determining the estimate for a future point in time comprises considering at least one air consumption of an additional consumer being connected to the air reservoir.

11. The method of claim 1, wherein said step of determining an estimate for a future point in time comprises considering pneumatic parameters of at least one pneumatic unit interposed between the air reservoir and the air suspension element or being located in parallel conduits.

12. The method of claim 2, wherein said step of determining an estimate for a future point in time comprises considering pneumatic parameters of at least one pneumatic unit interposed between the air reservoir and the air suspension element or being located in parallel conduits.

13. The method of claim 4, wherein said step of determining an estimate for a future point in time comprises considering pneumatic parameters of at least one pneumatic unit interposed between the air reservoir and the air suspension element or being located in parallel conduits.

14. The method of claim 6, wherein said step of determining an estimate for a future point in time comprises considering pneumatic parameters of at least one pneumatic unit interposed between the air reservoir and the air suspension element or being located in parallel conduits.

15. The method of claim 1, wherein said step of determining an estimate for a future point in time includes considering an operational state of a compressor.

16. The method of claim 1, wherein said step of determining an estimate for a future point in time includes considering a temperature.

17. The method of claim 2, wherein said step of determining an estimate for a future point in time includes considering a temperature.

18. The method of claim 4, wherein said step of determining an estimate for a future point in time includes considering a temperature.

19. The method of claim 6, wherein said step of determining an estimate for a future point in time includes considering a temperature.

20. The method of claim 11, wherein said step of determining an estimate for a future point in time includes considering a temperature.

21. The method of claim 1, wherein said step of determining an estimate for a future point in time comprises considering an operational state of the air suspension system.

22. The method of claim 1, wherein said step of determining an estimate for a future point in time includes considering a driving state of the vehicle.

23. The method of claim 1, further comprising the step of shifting the estimate for a point in time by the time interval correlating to the response time of the valve.

* * * * *